Patented Feb. 14, 1933

1,897,031

UNITED STATES PATENT OFFICE

LEONARD C. CHAMBERLAIN, OF MIDLAND, MICHIGAN, ASSIGNOR TO THE DOW CHEMICAL COMPANY, OF MIDLAND, MICHIGAN, A CORPORATION OF MICHIGAN

RECOVERING IODINE FROM NATURAL WATERS AND THE LIKE

No Drawing. Application filed March 2, 1931. Serial No. 519,697.

This invention relates to methods for extracting and recovering iodine from solutions or natural brines and the like. It has particular regard to methods wherein such iodine is adsorbed on active charcoal or other suitable adsorbent material and then recovered from the latter.

It is known that iodine, when present in the elemental state in an aqueous medium, may be separated therefrom by blowing out with a current of air. The so vaporized iodine may be removed from the iodine-laden air by contacting the same with a body of adsorbent material such as active charcoal. Difficulties arise, however, in recovering the iodine from the charcoal which holds the iodine very tenaciously. Chemical methods, such as treating the iodine-charged charcoal with aqueous caustic alkali or carbonate solutions, or with solutions of reducing agents, for example either basic or acid sulphite solutions, have resulted in only an imperfect recovery, often not materially exceeding 50 or 60 per cent. of the total iodine in the charcoal. Considerable irregularity is shown by different charcoals, or different lots of the same kind of charcoal, when they are treated with solutions of chemical reagents for removing adsorbed iodine therefrom, the percentage of total iodine recoverable thereby fluctuating greatly. At best, repeated washing of the treated charcoal is necessary to dissolve out the iodine compounds, thus diluting the solution obtained with a relatively large volume of wash water which must be evaporated in order to concentrate the solution sufficiently to crystallize out the dissolved salts. Furthermore, the iodine so recovered is in combined, and not elemental, form, and the salts obtained directly are not pure, being mixed with reagent used, so that further purification is required to prepare a marketable product.

It has also been proposed to drive off the iodine from the iodine-charged charcoal by heating to a high temperature e. g. 500° C. or even to incandescene, in a current of a gas non-reactive with the iodine, e. g. carbon dioxide, according to the method disclosed in U. S. Patent 1,438,071. There are serious disadvantages attaching to such mode of procedure, however, especially when it is desired to recover the volatilized iodine directly in the elemental form, owing to the great difficulty of condensing the vapor quantitatively when diluted by a large volume of permanent gases. The temperature at which such heating is carried out in also destructive of the charcoal, which is a relatively expensive material and in a commercial process must be conserved as far as possible so as to be used repeatedly.

In my copending application Serial No. 519,696, filed March 2, 1931, it has been disclosed that the recovery of iodine from iodine-charged charcoal is simplified and a materially greater percentage of the total iodine content is directly recovered when the charcoal is heated in a current of a readily condensable vapor, specifically steam. A further advantage of such improved procedure is that a considerably lower temperature, e. g. between 200° and 300° C. or even lower, may be employed, whereby loss of, or damage to, the charcoal is substantially avoided. A still further advantage is that the charcoal is maintained in a highly reactive condition as a result of the steaming-out treatment, thereby avoiding the necessity for periodical revivification.

In the aforesaid application the improvement is specifically incorporated in a method wherein the solution in which iodine has been liberated is treated directly with active charcoal, the latter then separated from the solution and steamed out to recover iodine therefrom. The present application more particularly concerns a complete procedure whereby iodine is liberated in the elemental state in a solution, then separated from the solution by blowing out with a current of air, the iodine-laden air contacted with active charcoal to adsorb the iodine thereon, and the charcoal finally steamed out to recover iodine therefrom. The invention accordingly consists of the steps hereinafter fully described and particularly pointed out in the claims, the following description setting forth in detail but one of the various ways in which the principle of the invention may be used.

The present improvements find particular application in the extraction of iodine from natural waters wherein such iodine is contained in exceedingly small amount accompanying a much greater concentration of chlorides or other salts. For example, I have applied the method for extracting iodine from a natural brine having a composition represented approximately by the following analysis:

| | | |
|---|---|---|
| Specific gravity | 1.036 | |
| NaCl | 4.87 | per cent |
| $MgCl_2$ | 0.41 | per cent |
| $CaCl_2$ | 0.26 | per cent |
| Fe | 0.0088 | per cent |
| $Br_2$ | 0.0208 | per cent |
| $I_2$ | 0.0045 | per cent |
| Alkalinity—approx. | 0.012 N | |

The brine is first acidified with a strong mineral acid, e. g. sulphuric acid, approximately to the degree of acidity expressed as $p_H = 3$, such degree of acidification having been found necessary to secure a complete liberation of all of the contained iodine in the following step. The acid solution is treated with chlorine in amount equivalent to the iodine present, thereby liberating the latter in the free state. In practice, this chlorination is controlled by means of a measurment of the oxidation potential of the solution, as explained in detail in a prior patent application of J. J. Grebe and R. H. Boundy, Serial No. 472,027, filed July 31, 1930. The oxidation potential of the solution rises during chlorination to a value between 0.50 and 0.54 volt, whereat all of the iodine will have been liberated, while an increase above the stated value indicates an excess of chlorine.

The chlorinated solution containing free iodine dissolved therein is then brought into contact with a current of air, whereby the iodine is blown out of the solution and carried away in the air current. This may be conveniently accomplished by spraying the solution into the top of the tower, wherein the fine spray falls by gravity against an upwardly rising current of air introduced at the base of the tower. For handling large volumes of iodine-containing brine a series of such towers may be provided, the liquor being forwarded from each tower to the one next in series, while the air current is conducted through the towers successively in the reverse direction. It is possible in this way to blow out between 90 and 100 per cent of the free iodine without excessive air consumption. The iodine-laden air leaving the tower is then passed through a body of active charcoal in any way adapted to secure intimate contact of the air current with the charcoal particles whereby substantially all of the iodine may be removed from the air. For the purpose I have found cocoanut charcoal particularly well adapted, employing the same in granular form preferably of approximately 6 to 20 mesh fineness. Such charcoal, I have found, is capable of adsorbing approximately nine-tenths of its weight of iodine. The body of charcoal may conveniently be contained in a tower or column through which the air current is conducted either upwardly or downwardly.

When the charcoal becomes saturated with iodine, the iodine-laden air current may be diverted to another adsorber connected in parallel therewith, while the iodine-charged charcoal is treated with steam to remove the iodine therefrom. When steam is employed instead of a permanent gas, such as carbon dioxide, I have unexpectedly found that a much lower temperature suffices to drive off practically all of the iodine. In fact, over 50 per cent of the iodine may be removed from active charcoal saturated therewith by treating with a current of steam at a temperature as low as 100° to 120° C., whereas at temperatures between 200° and 300° C. over 90 per cent of the iodine may readily be removed. The steaming-out operation may be performed by subjecting the iodine-charged charcoal to the action of superheated steam at a temperature between 200° and 300° C., and approximately atmospheric pressure, for instance by passing the steam through the body of charcoal in the adsorbing apparatus without removal of the charcoal therefrom. The exit vapors from the steaming-out operation are cooled and finally condensed, whereby the iodine is deposited in solid form which is easily separated from the aqueous condensate and dried, being thus recovered directly in a highly pure state. The charcoal, after steaming-out, may then be used to adsorb a further charge of iodine from the iodine-laden air current, any small residue of iodine remaining therein being thus returned to the process cycle without loss thereof.

Since as much as 50 per cent of the iodine adsorbed on the charcoal may be steamed out at a temperature of 100° C. or slightly higher and at about normal pressure, the steaming out operation may, if desired, be carried out in two stages, using lower temperature steam in the first stage to remove a portion of the iodine, and completing the operation with steam at 200° to 300° C. in the second stage. When employing two stages as described the consumption of steam will be somewhat greater, but only a portion thereof will require to be superheated to the higher temperature. In experiments I have found that the steam consumption, using steam at 200° C., is about 100 pounds per pound of iodine recovered, whereas when operating in two stages at about 120° and 200° C., respectively, a total of about 125 pounds steam per pound iodine was used, nearly equally divided between the lower and higher temperature steam. The actual steam consumption will vary considerably, however, depending upon the size and design of apparatus, manner of control, and other factors. In large scale operations the tendency is toward a materially lower steam consumption than that stated above.

The procedure hereinbefore described may be modified in various ways. For example, acidification to $p_H=3$ represents about the lower limit of acidity required for complete liberation of iodine, but a greater degree of acidification will not interfere therewith. Other ways of oxidizing the iodine content of the original brine than by chlorination may be employed, such as by electrolyzing or by adding other well known chemical oxidizing agents capable of liberating the iodine in the elemental state, e. g. hypochlorites, chlorates, bichromates, permanganates, nitrites, etc.

The present method, wherein the adsorbent charcoal does not at any time come in contact with salt solutions or the like either in the adsorption or steaming-out steps, avoids practically all possibility of contaminating the charcoal with foreign substances, such as salts, as well as oily or tarry impurities often associated with iodine-containing natural brines. Thereby the activity of the charcoal remains substantially unimpaired even after long-continued use, and little or no expense is entailed for repurification or revivification in connection with commercial production. The use of superheated steam for removing iodine from the charcoal is especially advantageous, not only in that it enables a materially higher degree of extraction of iodine therefrom at a lower temperature than by other methods employing heat, but also because it leaves the charcoal in a highly reactive condition suitable for adsorbing further quantities of iodine. Neither is the charcoal subjected to mechanical loss by attrition or crumbling. Losses by partial oxidation, which accompany heating at high temperatures in the presence of oxidizing gases such as air or carbon dioxide, are entirely avoided. The complete separation and recovery of vaporized iodine is easily accomplished by simple means when employing a readily condensable vapor such as steam for the vaporizing medium, the condensation of which aids materially in precipitating the iodine in solid form. I have found that there is no material action of the steam to cause conversion of iodine to hydriodic acid, and substantially all of the separated iodine is recovered as such either by condensing in solid form in a part of the apparatus maintained at a temperature slightly above 100° C., or by filtering the solid material from the aqueous condensate.

For purposes of the present invention, any form of activated carbon capable of adsorbing iodine may be employed as a substantial equivalent of charcoal, and in the claims the term "active charcoal" is understood to include such equivalent forms of activated carbon, whether prepared from wood or shell chars, from coal, or in any other way.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of extracting iodine from natural waters and the like wherein iodine is converted to the elemental state in the aqueous medium, the steps which consist in separating such iodine from the aqueous medium by blowing out with a current of air, removing iodine from the iodine-laden air by contacting the same with a body of active charcoal and recovering elemental iodine from such charcoal by heating with a current of superheated steam.

2. The method of extracting iodine from natural waters and the like which comprises oxidizing the same to liberate iodine in the elemental state, removing iodine from the aqueous solution by blowing out with a current of air, contacting the iodine-laden air with a body of active charcoal to adsorb iodine thereon, steaming-out the iodine-charged charcoal to vaporize iodine therefrom and separating iodine from the mixed vapors.

3. The method of extracting iodine from natural waters and the like which comprises acidifying the same, oxidizing to liberate iodine in the elemental state, removing iodine from the aqueous solution by blowing out with a current of air, contacting the iodine-laden air with a body of active charcoal to adsorb iodine thereon, vaporizing iodine from the charcoal by heating with a current of superheated steam at a temperature below 300° C., cooling and condensing the exit vapors and separating iodine from the aqueous condensate.

4. The method of extracting iodine from natural waters and the like which comprises acidifying the same to approximately the degree of acidity expressed as $p_H=3$, chlorinating to liberate iodine in the elemental state, removing iodine from the aqueous solution by blowing out with a current of air, contacting the iodine-laden air with a body of active charcoal to adsorb iodine thereon, vaporizing iodine from the charcoal by heating with a current of superheated steam at a temperature between 200° and 300° C., cooling and condensing the exit vapors and separating iodine from the aqueous condensate.

5. In a method of extracting iodine from natural waters and the like wherein iodine is converted to the elemental state in the aqueous medium, the steps which consist in separating such iodine from the aqueous medium by blowing out with a current of air, removing iodine from the iodine-laden air by contacting the same with a body of active charcoal and separating iodine from the charcoal by subjecting the latter to the action of steam at a temperature between 100° and 300° C.

6. In a method of extracting iodine from natural waters and the like wherein iodine is converted to the elemental state in the aqueous medium, the steps which consist in separating such iodine from the aqueous medium by blowing out with a current of air, removing iodine from the iodine-laden air by contacting the same with a body of active charcoal, removing iodine from the charcoal by subjecting the latter to the action of steam first at a temperature between 100° and 200° C., whereby a portion of the iodine is expelled, and then subjecting to the action of superheated steam at a temperature between 200° and 300° C. to distill off a further portion of the iodine.

7. In a method of recovering iodine, the steps which consist in contacting a current of iodine-laden air with a body of active charcoal to adsorb iodine thereon, and then heating such charcoal with steam at a temperature between 100° and 300° to distill iodine therefrom.

8. In a method of recovering iodine, the steps which consist in contacting a current of iodine-laden air with a body of active charcoal to adsorb iodine thereon and then separating such adsorbed iodine from the charcoal.

Signed by me this 24th day of February, 1931.

LEONARD C. CHAMBERLAIN.